United States Patent
Simon et al.

(10) Patent No.: US 6,356,088 B1
(45) Date of Patent: Mar. 12, 2002

(54) HIGHLY COMPACT LASER SCANNING MICROSCOPE WITH INTEGRATED SHORT-PULSE LASER

(75) Inventors: Ulrich Simon, Jena; Ralf Wolleschensky, Schoeten, both of (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/129,340

(22) Filed: Aug. 5, 1998

Related U.S. Application Data

(60) Provisional application No. 60/055,320, filed on Aug. 11, 1997.

Foreign Application Priority Data

Aug. 1, 1997 (DE) .......................... 197 33 195

(51) Int. Cl.$^7$ ........................................... G01R 31/302
(52) U.S. Cl. ...................... 324/752; 324/753; 250/311; 359/287; 359/368
(58) Field of Search ................... 324/752, 753, 324/73.1, 96, 765, 750; 359/388, 368, 381, 385, 287; 250/310, 306, 307, 492.21, 311

(56) References Cited

U.S. PATENT DOCUMENTS

| | | | | |
|---|---|---|---|---|
| 3,851,949 A | * | 12/1974 | Kraft et al. ................. | 359/388 |
| 5,034,683 A | * | 7/1991 | Takahashi et al. .......... | 324/753 |
| 5,535,052 A | * | 7/1996 | Jorgens ....................... | 359/388 |
| 5,569,916 A | * | 10/1996 | Tomie ........................ | 250/287 |
| 5,598,002 A | * | 1/1997 | Todokoro et al. ........... | 250/310 |
| 5,770,861 A | * | 6/1998 | Hirose et al. ................ | 250/310 |
| 5,811,803 A | * | 9/1998 | Komatsu et al. ............ | 250/310 |
| 5,883,518 A | * | 3/1999 | Borden ....................... | 324/752 |

* cited by examiner

Primary Examiner—Ernest Karlsen
Assistant Examiner—Minh N. Tang
(74) Attorney, Agent, or Firm—Reed Smith LLP

(57) ABSTRACT

The invention describes a highly compact laser scanning microscope with integrated short-pulse laser. Direct coupling or a fiber coupling of the short-pulse laser with the laser scanning microscope is advantageously circumvented with this arrangement. This compact arrangement of the laser in the scan module of the laser scanning microscope can be used in a particularly advantageous manner, for example, in multiphoton microscopy for three-dimensionally resolved microscopic analysis, e.g., of biological specimens. Because of the inherent depth discrimination of the multiphoton technique, confocal pinholes can be entirely omitted in the detection beam path. Accordingly, the microscope system can be realized in a very simple manner with respect to engineering and is particularly simple to handle with respect to application. Through the use of a short-pulse laser system in which a plurality of wavelengths are available simultaneously, diverse applications can be realized in one and the same compact microscope system.

19 Claims, 4 Drawing Sheets

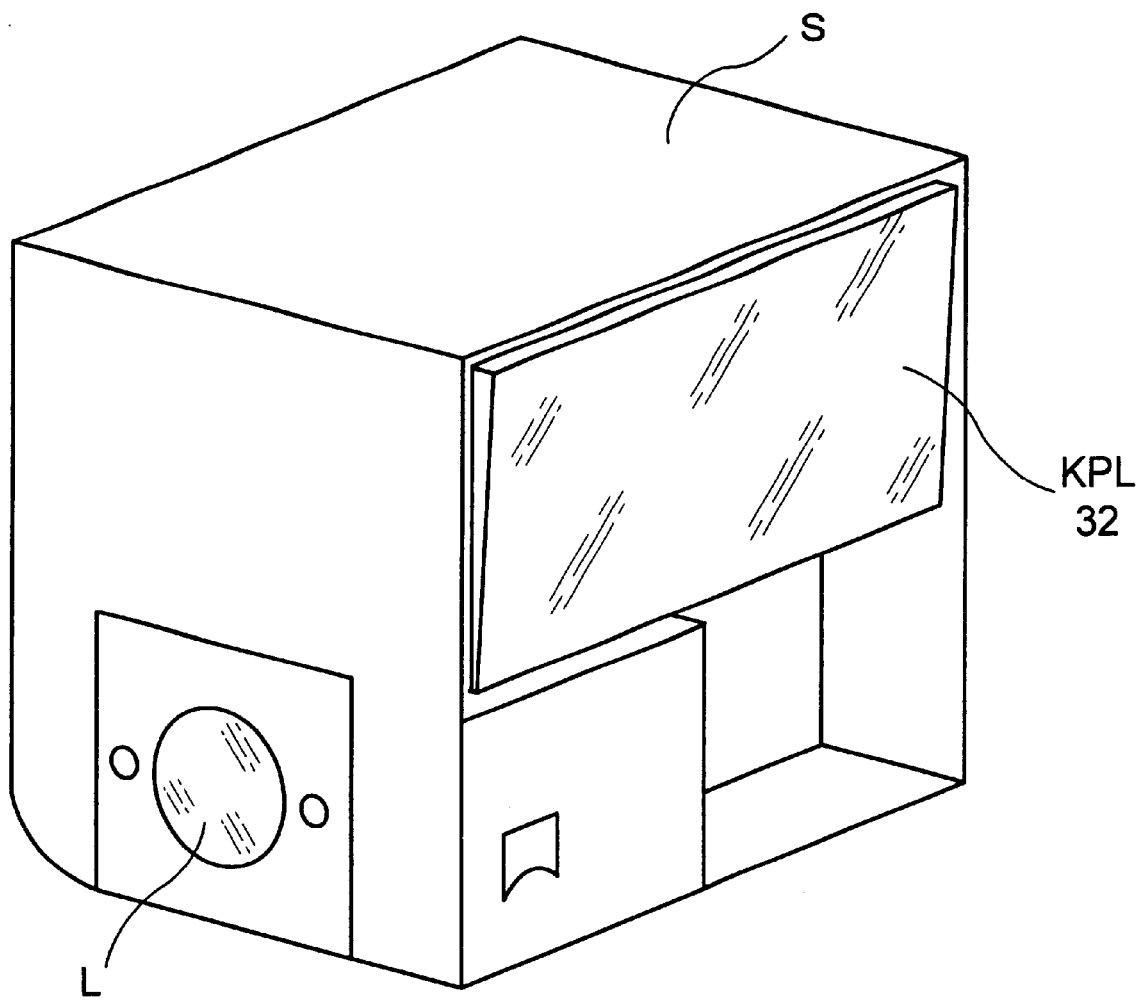
F I G. 1

HIGHLY COMPACT LASER SCANNING MICROSCOPE WITH INTEGRATED SHORT-PULSE LASER

RELATED APPLICATION

This application claims the benefit of U.S. Provisional Application No. 60/055,320, filed Aug. 11, 1997.

BACKGROUND OF THE INVENTION

The present invention relates to a highly compact laser scanning microscope with integrated short-pulse laser.

Laser scanning microscopes using short-pulse lasers (e.g., picosecond or femtosecond lasers) have long been known, primarily in time-solved and multiphoton microscopy.

WO 91/07651 discloses a two-photon laser scanning microscope with excitation through laser pulses in the subpicosecond range at excitation wavelengths in the red or infrared region.

EP 666473A1 WO 95/30166, DE 4414940 A1 describe excitations in the picosecond range, and beyond, with pulsed or continuous radiation.

A process for optical excitation of a specimen by means of two-photon excitation is described in DE C2 4331570.

DE 29609850 by the present Applicant describes coupling of the radiation of short-pulse lasers into a microscope beam path via light-conducting fibers.

The short-pulse lasers that are used (wavelength-tunable lasers as well as fixed wavelength lasers) are, among other things, very bulky and, because of their great technical complexity, very expensive and can only be handled with difficulty by the user. In general, lasers are optically coupled directly into the scan module of the laser scanning microscope by means of beam guiding systems (e.g., mirrors or glass prisms). This generally requires long optical beam paths which renders the system sensitive to adjustment and results in very large systems because of the extent of the optical beam path. The frequently required adjustment of the laser (particularly also when the laser wavelength is changed or tuned) results, among other things, in spatial drifting of the laser beam coupled out of the laser. Consequently, the laser beam is no longer optimally adjusted within the laser scanning microscope. The latter problem can be avoided by means of a fiber coupling (e.g., using single-mode, polarization-conserving fibers) of the short-pulse laser, so that the laser and laser scanning microscope are adjusted in isolation from one another. This kind of fiber coupling of a short-pulse laser in a laser scanning microscope is basically possible, but is very problematic for the short pulses due to the optical scattering of the glass fibers and nonlinear optical effects such as self-phase modulation, Brillouin scattering, Raman scattering, etc. which can occur at the high laser intensities in the glass fiber core.

OBJECT AND SUMMARY OF THE INVENTION

It is object of the present invention to provide a highly compact laser scanning microscope with a short-pulse laser integrated in the scan module. Optical direct coupling or a fiber coupling of the short-pulse laser with the laser scanning microscope can be advantageously circumvented with this arrangement.

Short-pulse lasers which can be engineered in a highly compact constructional form of this kind are, for example, diode laser pumped ion-doped fiber lasers, e.g., diode pumped $Er_{3+}$ doped fiber lasers with a laser emission from the resonator cavity at a wavelength of about 1550 nm. This laser radiation can be frequency-doubled in a highly efficient manner (resonant, nonresonant, quasi-phase matching) to a wavelength of about 790 nm outside of the laser resonator cavity by means of nonlinear optical crystals due to the high laser intensities. A portion of the radiation is also converted in the crystal to the third harmonic at approximately 515 nm and to the fourth harmonic at approximately 387 nm. All other conceivable nonlinear conversion processes also occur in the crystal with a determined conversion efficiency. Accordingly, for example, a highly compact short-pulse laser with several different fixed output wavelengths simultaneously is made available for diverse microscope applications.

The laser can be furnished, for instance, in a compact housing which is fastened in the chassis of the scan module and the laser beam can be emitted from an opening in the compact housing, possibly so as to be adjustable (FIG. 1). The laser beam can pass through an optical system arranged outside of the compact housing which transforms it to a suitable beam diameter and beam divergence. This optical system can be constructed variably such that it is suitable for adapting the beam to the chromatic characteristics of the microscope optical system (e.g., a variable beam expander); it can also be constructed in such a way that it is suitable for adapting the beam diameter to the diameter of the objective pupil for optimizing the ratio of transmission to spatial resolution (variable zoom).

A laser shutter (beam interrupter) for ensuring laser safety in the device is to be integrated in the laser beam path in the scan module of the laser scanning microscope. This can be constructed, for example, as a mechanical beam interrupter.

The laser radiation can be guided through a wavelength-selective optical element for selecting the laser wavelength required by the application. This element can be constructed as a dielectric filter, an acousto-optical, electro-optical, refractive, or dispersive element or as a combination of these.

The laser radiation can be guided through an intensity-damping element for adjusting the laser output required by the application. This element can be constructed as a neutral filter, as an acousto-optical, electro-optical, refractive, or dispersive element or as a combination thereof. In the case of an acousto-optical element, this can also be advantageously used as a pulse picker for varying the pulse repetition rate of the laser (temporal isolation of individual laser pulses from the continuous train of laser pulses).

A prechirp unit, e.g., comprising a sequence of gratings or prisms or a combination thereof, can be inserted in the laser beam path (illumination beam path) in order to provide negative dispersion for compensating for the positive dispersion of the optical system including the scan module, microscope and specimen. Accordingly, it is possible in an advantageous manner to provide laser pulses at the location of the specimen which are transform-limited as far as possible.

The laser radiation then impinges on a main beam splitter (e.g., a dielectric color splitter) which steers the laser radiation in the direction of the specimen being analyzed. This main beam splitter which can be constructed as one of many color splitters in a main beam splitter turret can also be constructed, at the same time, as the wavelength-selective optical element for selecting the laser wavelength required by the application. In the case of nonoptical detection techniques (e.g., OBIC or LIVA), the main beam splitter can also be constructed as a fully reflecting mirror.

Galvanometer scanners can be used as laser beam scanners for deflecting the beam in the x- and y-direction. In the case of multiphoton microscopy, the fluorescence is excited in the specimen by one or more of the available laser wavelengths. The detection of the fluorescence radiation is then carried out in part in a multichannel arrangement according to FIG. 2 in which the use of confocal pinholes for achieving three-dimensional resolution is not necessary. In one variant, however, confocal pinholes can be used in order to further increase the depth resolution beyond that of simple multiphoton microscopy (FIG. 3).

Detection of an optical or nonoptical signal in descanned or non-descanned detector configuration.

Depending on the pulse-width repetition rate of the pulsed laser radiation, a lock-in amplifier or a boxcar amplifier can be used in synchronization with the pulse repetition rate of the laser for phase-sensitive detection of the detection signal. This results in a considerably improved signal-to-noise ratio by reduction of the bandwidth in the detection system in which noise is detected.

The use of wavelengths around 1550 nm is pertinent, for example, in microscopic inspection of semiconductors, especially structured silicon wafers. Wavelengths around 1550 nm are also still favorably transmitted through highly doped silicon. Only in the immediate area of the objective focus, and thus with depth discrimination, is there an excitation of nonlinear optical processes such as multiphoton excitation (e.g., also OBIC or LIVA as nonoptical detection techniques) or higher-harmonic generation. These nonlinear processes can accordingly also be used as a microscopic contrasting method in connection with thick silicon substrates for three-dimensionally resolved microscopy, e.g., in the field of nondestructive testing of wafers.

The wavelength around 790 nm is suitable, for example, especially for universal excitation of two-photon processes in dyes conventionally used for fluorescence tagging of biological specimens.

The green wavelength and ultraviolet wavelength at 517 nm and 387 nm, respectively, can be used, for example, for analyzing specimens in reflection contrast, fluorescence contrast, for time-resolved microscopy. The green radiation at 517 nm can also be used as a visible pilot beam for adjustment when assembling the optical system.

In particular, the described system is suitable for use in physiological inquiries, e.g., for releasing caged compounds. In this case, radiation at 790 nm can be utilized by means of three-photon processes for uncaging even in deep layers of thick specimens, while the observation of the liberated ions is then carried out by two-photon excitation of the fluorophores used for tagging.

The invention is characterized by the following particularly advantageous central features:

integration of a short-pulse laser in the scan module of a laser scanning microscope for providing a highly compact microscope system;

integration of a (frequency-tunable or wavelength-tunable) short-pulse laser with an optical arrangement following the laser resonator cavity and comprising one or more nonlinear optical crystals for frequency conversion of the laser radiation by means of frequency doubling, frequency tripling, sum frequency generation, difference frequency generation, another optically parametric process, or any desired combination thereof, for providing a plurality of wavelengths for diverse microscope applications;

its use in time-resolved laser scanning microscopy;

its use in confocal or nonconfocal laser scanning microscopy using an optical detection signal;

its use in laser scanning microscopy using a nonoptical detection signal;

its use in laser scanning two-photon microscopy;

its use in material analysis, especially frequency doubling (SHG) at surfaces by means of a laser scanning microscope;

its use in material analysis, especially for two-dimensional or three-dimensional OBIC;

combined use of two or more of the techniques described above.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 1 An exemplary arrangement of the integration of a compact short-pulse laser in the scan module of a laser scanning microscope;

DETAILED DESCRIPTION OF CERTAIN PREFERRED EMBODIMENT

FIG. 1 shows schematically the housing of a scan head S which is connectable with a microscope beam path via a light passage opening L, wherein the scan head S is described in detail with reference to the subsequent Figures.

Integrated within this housing is the housing of a short-pulse laser KPL 32 which accordingly forms a compact unit with the scan head S.

A cover, not shown, is advantageously provided at the housing of the scan head and accordingly also covers the laser 32.

Figure 2:
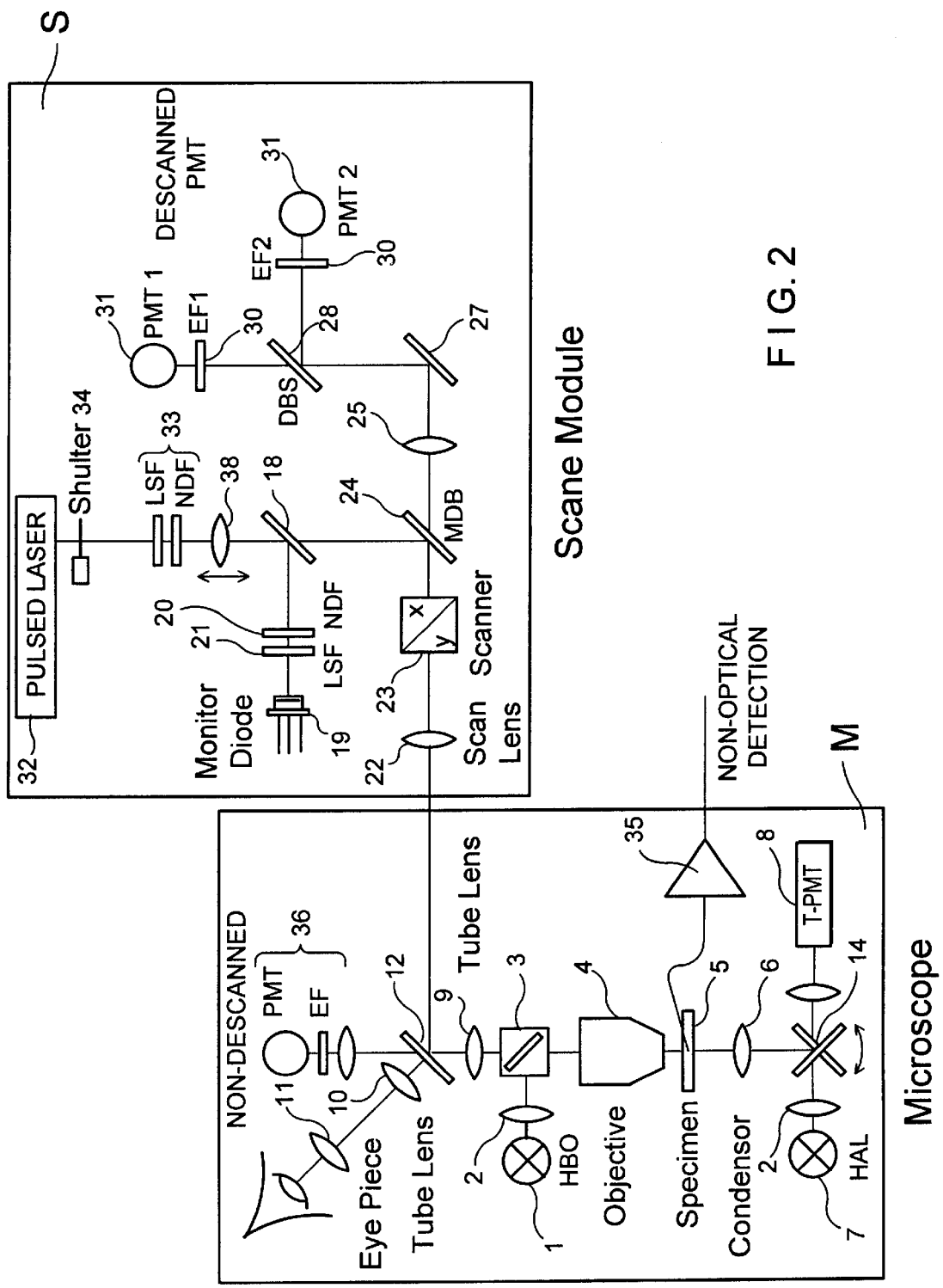
FIG. 2 Optical beam path for carrying out the integration of a compact short-pulse laser in the scan module of a laser scanning microscope without the use of confocal pinholes in the detection beam path.

FIG. 2 is a schematic view of a microscope unit M and a scan head S sharing a common optical interface.

The scan head S can be attached to the photo tube of an upright microscope and also advantageously to a side output of an inverse microscope (DE 4323129 A1).

FIG. 2 shows a microscope beam path which can be switched between reflected-light scanning and transmitted-light scanning by means of a swivelable mirror and which has a light source 1, illumination optics 2, beam splitter 3, objective 4, specimen 5, condenser 6, light source 7, receiver arrangement 8, a first tube lens 9, an observation beam path with a second tube lens 10, an eyepiece 11, and a beam splitter 12 for coupling in the scanning beam.

Figure 4:
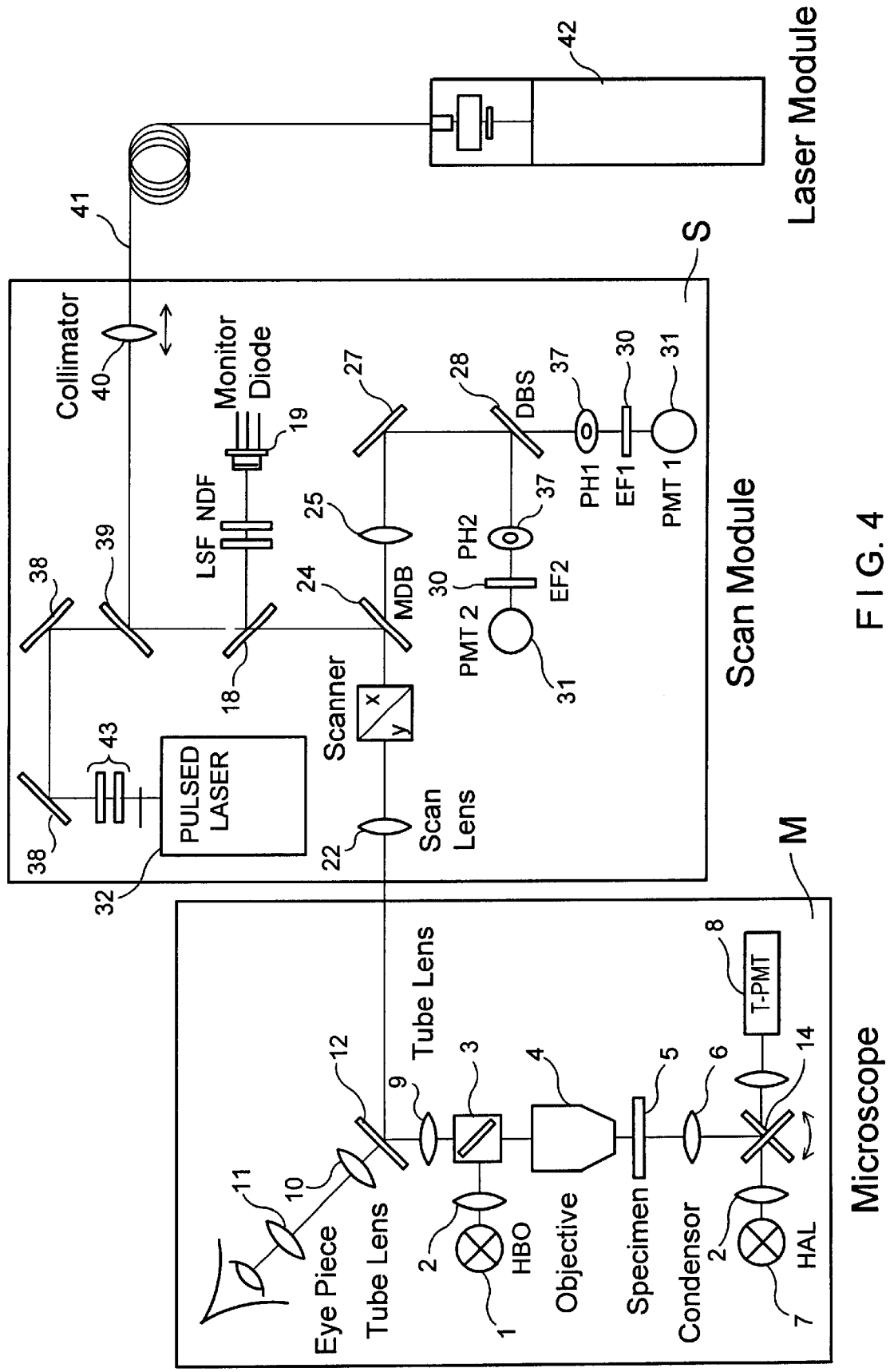
FIG. 4 The beam path for a combination, according to the invention, of a laser coupled in externally via an optical fiber for standard operation of a laser scanning microscope and integrated short-pulse laser.

According to the invention, a component part of the scan head is a short-pulse laser 32 followed by a shutter 34 and filters 33 for wavelength selection or, as is shown schematically in FIG. 4, followed by one or more nonlinear optical crystals 43 for frequency conversion by means of frequency multiplication, sum frequency generation, or difference frequency generation, which short-pulse laser 32 can be arranged in or on the housing, as is shown in FIG. 1, and coupled into the scanning beam path by means of suitable beam deflecting elements, especially mirror 38 according to FIG. 4, in the present case via splitter mirror 24.

Optics 38 which are displaceable along the optical axis are advantageously provided for the purpose of a defined adjustment and/or change of the focus in the specimen.

In this way, for the first time, a separate laser unit is advantageously dispensed with, which, in addition to the increased compactness, has special advantages with respect to fixedly adjusted alignment. Any alignment or input coupling problems in connection with coupling into fibers are likewise eliminated.

Also provided are means 35 for nonoptical detection, especially for current measurement in semiconductor inspection, and additional detection means, in this case a PMT following optics and filters, without passage of the object light through the scanning means behind the mirror 12 which is partially transmitting.

The scan unit further comprises a scanning objective 22, scanner 23, main beam splitter 24, and shared imaging optics 25 for detection channels. A deflecting prism 27 behind the imaging optics 25 reflects the radiation coming from the object 5 in the direction of dichroitic beam splitter 28 in the convergent beam path of the imaging optics 25, following which are arranged emission filters 30 and suitable receiver elements 31 (PMT).

A monitoring beam path is masked out by means of a partially transmitting mirror 18 in the direction of a monitor diode 19 subsequent to line filters 21 and neutral filters 20 advantageously on a revolving filter wheel, not shown.

Figure 3:
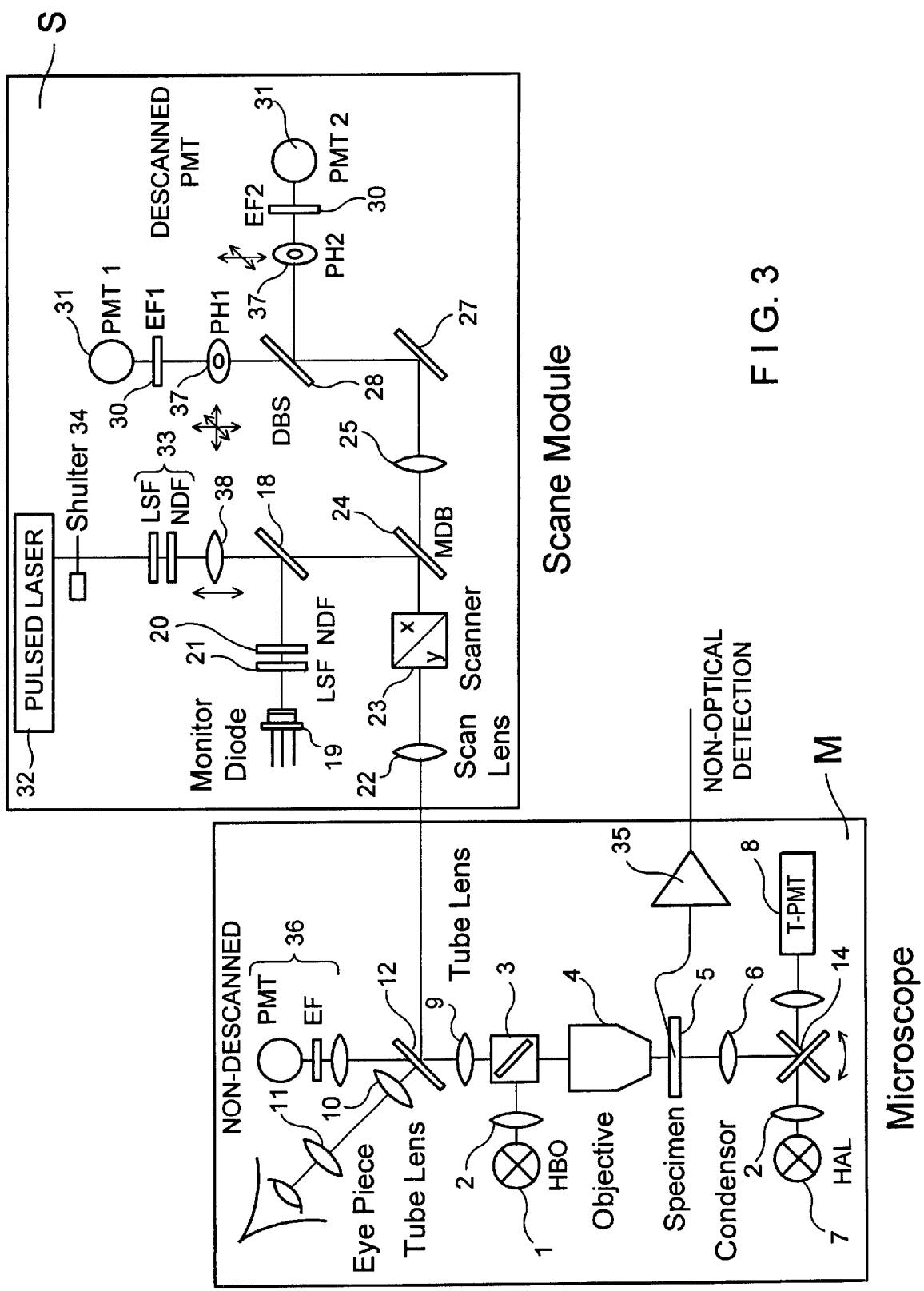
FIG. 3 Optical beam path for carrying out the integration of a compact short-pulse laser in the scan module of a laser scanning microscope using confocal pinholes in the detection beam path.

Pinholes arranged in front of the receivers 31 can be advantageously dispensed with in the case of multiphoton excitation due to the high spatial resolution, wherein, however, these pinholes can be used as pinholes 37, according to FIG. 3, precisely in the case of a combination with additional lasers as shown in FIG. 4. so as to be displaceable in three dimensions.

In FIG. 4, an optionally addable external laser 42 is connected with the laser input coupling unit of the scan head S by means of a light-conducting fiber 41 and is coupled into the scanning beam path by means of a displaceable collimator 40 and beam deflecting element 39. This can also be a laser module, not shown, with a plurality of single-wavelength and multiwavelength lasers which are coupled into one or more fibers individually or jointly.

Further, the coupling in can also be carried out through a plurality of fibers simultaneously whose radiation is mixed on the microscope side through color combiners after passing through adapting optics, not shown.

It is also possible to mix the radiation of different lasers at the fiber input by means of splitter mirrors, not shown. In this case, the short-pulse laser 32 integrated in the scan head in accordance with the invention is adapted, with respect to its direction, geometrically to the continued scanning beam path and to the position of the mirror 39 by means of deflecting elements 38.

While the present invention has been particularly shown and described in conjunction with preferred embodiment thereof, it will be readily appreciated by those of ordinary skill in the art that various change may be made without departing from the spirit and scope of the invention.

Therefore, it is intended that the appended claims be interpreted as including the embodiments described herein, the alternatives mentioned above, and all equivalents thereto.

What is claimed is:

1. A highly compact laser scanning microscope, comprising:
    a microscope part with a microscope beam path and transfer optics for imaging radiation coming from an analyzed object in direction of observation means and/or detection means;
    a scanning part with scanning means for deflecting a laser beam, wherein the microscope part and the scanning part optically interface for coupling laser light into the microscope beam path, the scanning part including a short-pulse laser for multiphoton excitation, and input coupling means for coupling the radiation of the short-pulse laser into the scanning means; and
    nonlinear means for adjustable frequency conversion of the radiation.

2. The laser scanning microscope of claim 1, wherein said input coupling means also is provided for beam adaptation with respect to diameter and divergence of the radiation.

3. The laser scanning microscope of claim 1, further comprising variable input coupling means.

4. The laser scanning microscope of claim 1, wherein said input coupling means is displaceable along the optical axis.

5. The laser scanning microscope of claim 1, further comprising a lock or closure at the laser output.

6. The laser scanning microscope of claim 1, further comprising adjustable filters at the laser output.

7. The laser scanning microscope of claim 1, further comprising an intensitydamping element at the laser output.

8. The laser scanning microscope of claim 1, further wherein said nonlinear means for adjustable frequency conversion of the radiation comprises nonlinear optical crystals.

9. The laser scanning microscope of claim 1, further comprising means for frequency doubling, frequency tripling, sum frequency generation or difference frequency generation by nonlinear optical crystals.

10. The laser scanning microscope of claim 1, further comprising detection means for detecting multiphoton excitation at least partially without pinholes preceding the detection means.

11. The laser scanning microscope of claim 1, wherein said laser scanning microscope is applied to semiconductor inspection.

12. The laser scanning microscope of claim 1, wherein said laser scanning microscope is adapted to generate a nonoptical detection signal.

13. The laser scanning microscope of claim 1, wherein said laser scanning microscope is applied to an OBIC application.

14. The laser scanning microscope of claim 1, further comprising a wavelength diode-pumped Er 3' doped fiber lasers with a wavelength of about 1550 nm.

15. The laser scanning microscope of claim 1, further comprising nonlinear optical crystals for frequency doubling the light to about 790 mn.

16. A highly compact laser scanning microscope, comprising:
    a first housing with a microscope beam path, a microscope objective and at least one transfer lens for imaging radiation coming from an analyzed object in a direction of an observation means and/or detection means;

a second housing, wherein the first and second housings optically interface for coupling laser light into the microscope beam path, the second housing including scanning means for deflection of a laser beam;

a short-pulse laser for producing multiphoton excitation, said short-pulse laser being integrated in the second housing;

input coupling means for coupling the radiation of the short-pulse laser into the scanning means; and a second laser for supplying radiation into the second housing; said second laser being coupled externally via light-conducting fibers.

17. The laser scanning microscope of claim 16, wherein the scanning means of the second housing includes detection means for detecting the radiation coming from a specimen.

18. The laser scanning microscope of claim 16, wherein said second laser is contained separate from the second housing.

19. The laser scanning microscope of claim 16, further comprising light conductors operable to introduce the radiation from the second laser into the second housing.

* * * * *